W. T. SEARS.
THROTTLE CONTROLLING APPARATUS.
APPLICATION FILED DEC. 22, 1917.
1,322,961.
Patented Nov. 25, 1919.
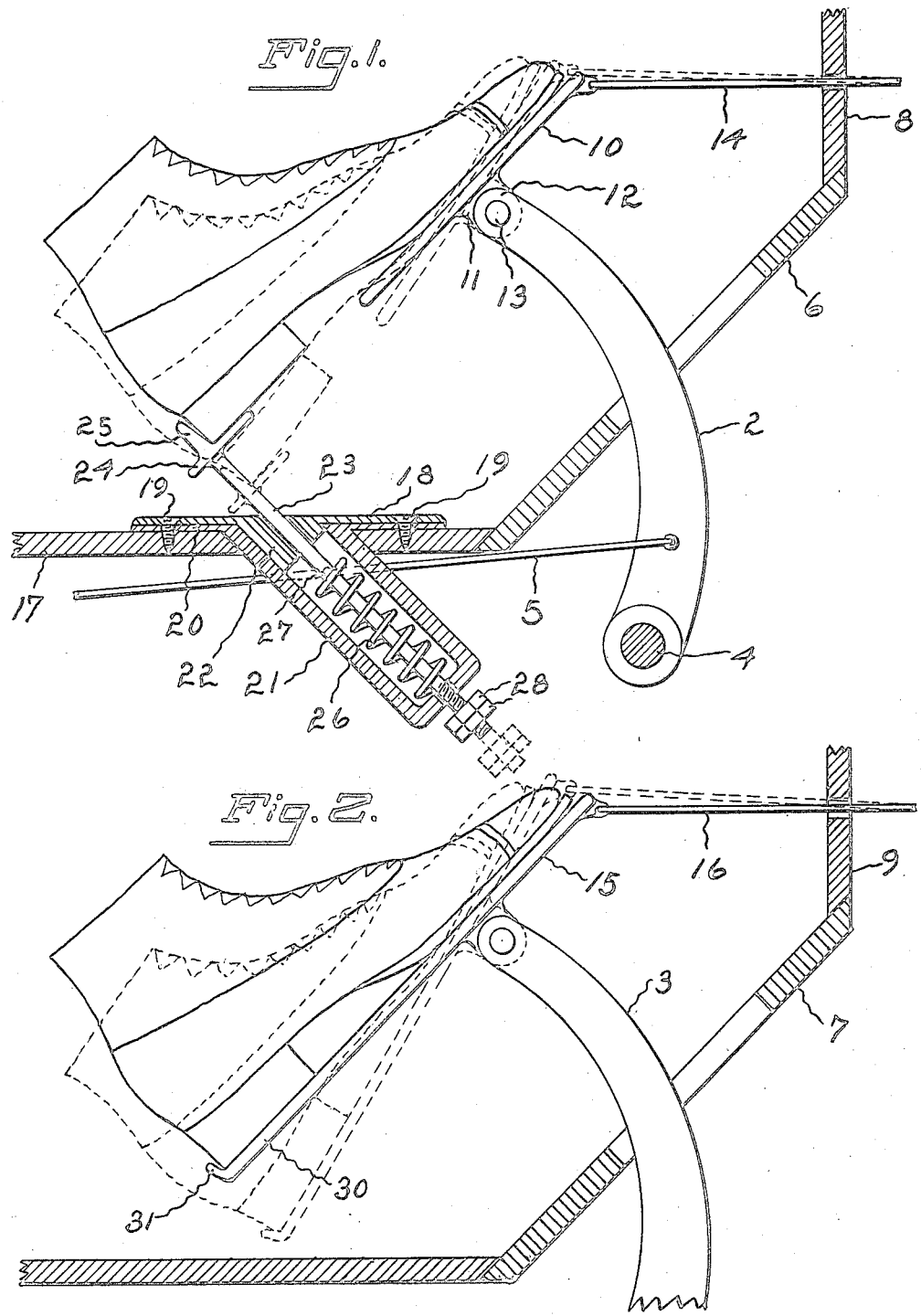
Inventor
W. T. Sears
By Heath Sutherland
Attorney

UNITED STATES PATENT OFFICE.

WILLARD T. SEARS, OF NEW YORK, N. Y.

THROTTLE-CONTROLLING APPARATUS.

1,322,961. Specification of Letters Patent. Patented Nov. 25, 1919.

Application filed December 22, 1917. Serial No. 208,389.

*To all whom it may concern:*

Be it known that I, WILLARD T. SEARS, a citizen of the United States, residing at New York, in the county of New York and State of New York, have invented certain new and useful Improvements in Throttle-Controlling Apparatus, of which the following is a specification.

This invention relates to throttle controlling apparatus. It is practically an improvement or at least modification of that set forth in Letters Patent No. 1,236,849 granted to me August 14, 1917, and to which reference may be had. Experience has proven that throttle controlling apparatus such as that set forth in said Letters Patent is highly practicable; I have found, however, that the foot-rest disclosed in said patent was not always successful, in that at times it tends to scrape the back of the ankle when the heel is thrown forward. While as will be understood this is not a particularly serious defect, it is, however, objectionable or irritating certainly at times. By the present structure this point is eliminated in a very satisfactory way, and this as will be inferred, is possibly the primary motive of the improvement. There are, of course, other features of novelty and advantage which with the foregoing will be stated rather fully in the following description, wherein I will set forth in detail at least two forms of embodiment of the invention. I do not necessarily limit myself to this particular disclosure; I may depart therefrom in several respects within the scope of the invention defined by the claims following said description.

Referring to said drawings:

Figures 1 and 2 are sectional side elevations each of a portion of an automobile equipped with throttle controlling means involving the invention, certain of the parts being shown in different positions by full and dotted lines.

An automobile is generally provided with several elements which can be broadly considered as "movement-controlling devices", which ordinarily take the form of levers. One of these elements or levers coacts with a clutch and another with a brake. These two particular levers govern in different ways the movement of the vehicle, and they, therefore, constitute examples of movement controlling elements. In addition to the movement controlling element, there is throttle controlling means involving a suitable pedal, and while this pedal or equivalent may be carried by any one of the governing elements, I prefer that it be mounted on the brake lever as shown in both views. The brake lever in Fig. 1 is denoted by 2 and that in Fig. 2 by 3. The brake lever 2 is rigid with the shaft 4 and the same observation applies with the organization illustrated by Fig. 2, although the shaft does not appear therein. In both views the brake lever is shown as off or as it is some times considered "out", the brake when said lever is in such position being off or inactive. When on or in at which time the brake is set, the lever is in a forward position. I do not show any brake bands, but I do show in Fig. 1 a rod 5 as jointed to the lever 2 above its center of motion, this constituting a convenient means for effecting through the primary action of the brake lever the brake band to either set or unset the same. The rod 5 is omitted from Fig. 2. The foot board denoted by 6 and 7 in the respective views is slotted for the passage of the brake lever which is usual. From the foot board the dash denoted by 8 and 9 respectively rises.

Referring now more in detail to Fig. 1, the brake lever 2 has pivoted to its upper end the pedal 10, said pedal having between its ends on the lower or forward side the lug 11 straddled by the fork 12 at the upper end of the brake lever, the lug being pivoted to the brake lever as by the pin 13. To the forward or tip portion of the pedal 10 is jointed the rod 14 which extends through an opening in the dash 8 and which has an operative connection with the throttle (not shown) in such manner that when the brake lever 2 is advanced to set the brake mechanism, the rod will be moved forward to cause the closing of the throttle or at least to secure the minimum supply of hydrocarbon fluid or other agent to the engine. Without going into detail in the action of the structure, I might say that as thus far described, this action is practically the same as that set forth in my prior Letters Patent. The lever 3 has pivoted to its upper end the pedal 15, to which is jointed a rod 16 extending through an opening in the dash 8. So far as the controlling action as I may consider it is concerned, the two are the same and as will be evident the invention rather resides in heel rest means.

In conjunction with an automobile movement governing element such as 2 or 3, a throttle controlling member such as 10 or 15 which is movably supported by the element, I associate a heel rest which sustains the heel portion of the foot of the operator when the sole portion of the foot is against said member, said heel rest being movable with the heel as the forward portion of the foot is shifted to effect the action by the operator of the throttle controlling member. This heel rest may be related with the throttle controlling member in various ways. It may be supported entirely independently of the throttle controlling member, or it may constitute a part or continuation of the same as shown for instance by Figs. 1 and 2 which I will now further describe.

On the horizontal part 17 of the floor-board I have shown the plate 18 which may be conveniently held in place by screws 19. Below this plate is a second plate 20 from which extends downward and forward at an angle the case 21 receiving within its upper end the boss or plug part 22 depending from the upper plate 18. This plug or boss 22 has a bore or perforation extending through it upon practically the same angle as the case 21 to slidingly receive the angularly disposed shank or spindle 23 terminating at its upper end in a heel rest 24 complemental to the pedal 10, although in this form of the device the heel rest is supported independently of the pedal. The heel rest is adapted to sustain the heel and is provided with an extension 25 against which the back of the heel may bear. Surrounding the shank or stem 23 is the coiled spring 26 within the case 21, the upper end of the spring bearing against a pin 27 on the shank or stem and the rear end bearing against the closed end of the case. Said closed end is perforated for the passage of the stem or shank 23 and is threaded to receive the holding and check nuts 28.

In full lines in Fig. 1 the parts are shown as occupying their normal or initial positions by dotted lines. It will be assumed that the sole portion of the foot is tipped to correspondingly tip the pedal 10 and thus effect through the rod 14 the desired action of the throttle. Necessarily the heel portion of the foot will be correspondingly tipped, so that the heel rest will be thrust downwardly and forwardly, all as shown by dotted lines in Fig. 1. On the downward movement of the heel portion 24 the spring 26 is of course compressed as the rod or stem 23 moves downwardly and forwardly so that as the foot of the operator is tipped backward, the heel portion 23 is caused to assume its primary position through the reaction of the spring.

In Fig. 2 the heel portion 30 as I have considered it, is rigid with the pedal 15, the two parts being integral and in the same plane. The back of the heel portion 30 has an upstanding flange or projection 31 which is engaged by the back of the foot or shoe of the chauffeur. The movements of the heel portion 30 correspond of course, in this case exactly with those of the pedal 15 as shown by dotted lines.

In both cases it will be seen that when the foot is moved to tip the pedal to open the throttle, the heel support moves downwardly and forwardly with the heel, and there is no tendency for said heel support to scrape the back of the heel of the foot. Really the vital difference between the two forms of the device is that in Fig. 1 which is the preferred form in fact, the heel support is mounted independently of the pedal, whereas in Fig. 2 the two parts are rigid with each other. The vital point in them both is that the support for the heel is firm and substantial in a backward direction, yet the heel rest permits the heel of the foot following it when the heel is moved in the present case practically downwardly and forwardly.

What I claim is:

1. Throttle controlling apparatus for an automobile comprising an automobile brake-lever, a pedal supported by the brake-lever, for oscillation and to be operated by the sole of the foot of the operator, means actuated by said pedal, for controlling the accelerating mechanism of the automobile, said pedal having a heel rest associated therewith for supporting heel of said foot, the heel rest being movable as the foot oscillates said pedal and having means to positively prevent backward movement of the foot as the latter operates the pedal, the acceleration of the automobile taking place when the heel is depressed and retardation occurring when the heel is raised, the foot-supporting surfaces of the pedal and the heel-rest being approximately in the same plane.

2. Throttle controlling apparatus comprising an automobile brake-lever, a pedal supported by the brake-lever, for oscillation and to be operated by the sole of the foot of the operator, means actuated by said pedal, for controlling the accelerating mechanism of the automobile and connected with the pedal at a point in front of the center of motion of the pedal, said pedal having a heel-rest associated therewith, for supporting the heel of said foot, the heel-rest being movable as the foot oscillates said pedal and having means to positively prevent backward movement of the foot as the latter operates the pedal, the foot-supporting surfaces of the pedal and the heel-rest being approximately in the same plane.

3. The combination of an automobile movement governing lever, a throttle controlling pedal pivotally supported by said lever for movement relatively thereto, and a heel rest to sustain the heel portion of the foot of the operator when the sole portion of the foot is against said pedal, said heel rest having means to prevent backward movement of the foot, a case, the heel rest having a spindle extending through the case, and a spring in the case to act against the spindle and tending constantly to hold the same in its normal position.

In testimony whereof I affix my signature in the presence of two witnesses.

WILLARD T. SEARS.

Witnesses:
 O. S. ACKLEY,
 A. BERTRAND.